May 7, 1963   W. E. CUNNINGHAM ETAL   3,088,210
MICROMETRIC GRID CALCULATOR
Filed Jan. 20, 1959   3 Sheets-Sheet 3

Wm. E. Cunningham
Arnold L. Ross
JOINT INVENTORS

BY *W.E. Cunningham*

# 3,088,210
MICROMETRIC GRID CALCULATOR
William E. Cunningham, 111 S. Central Ave., and Arnold
L. Ross, 1847 Madsen Ave., both of Visalia, Calif.
Filed Jan. 20, 1959, Ser. No. 787,930
2 Claims. (Cl. 33—76)

This invention relates to a new kind of instrument that will be of great value to surveyors, engineers, contractors, navigators and teachers, and particularly to a micrometric grid calculator which, with micrometers capable of measuring accurately to $\frac{1}{10000}$ of an inch, will be capable of giving visible calculations with the high degree of accuracy required in the professions.

For the past many years, very few changes or improvements have been made in calculating instruments for surveyors and workers in similar fields. At present, surveyors have to carry into the field transits, plane tables, tables of trigonometric functions and calculators. Transferring data from one instrument to another always makes for the possibility of errors.

An object of our invention is to provide one instrument which, with a few accessories, will replace several now required and will eliminate the need for tables of trigonometric functions and calculators.

A further object of our invention is to provide a calculator that will give a direct reading of the sine and cosine of any angle from 0 degrees to 90 degrees to five places.

Another further object is to provide a calculator that will enable the user to accurately determine the other two sides of a right triangle if one side and an acute angle are known.

Another further object is to provide an instrument that will enable users to determine accurately the bearing of one check point with another; to give an accurate visible reading of the latitude and departure of one check point with another with or without knowledge of the bearing; to quickly and accurately determine the distance between two check points, between which it is impossible to take measurements, if the latitude and departure are known or the bearing can be determined.

Another further object of our invention is to provide an instrument with slide rule accuracy that will enable teachers to quickly check work of students in trigonometry and similar courses.

Another further object is to provide a basic instrument to which the following detachable instruments may be added: a self-aligning compass for accurate orientation of the basic instrument; a reversible telescope to convert basic instrument into a transit; and a reversible sight to make an alidade for less accurate work.

Figure 1:
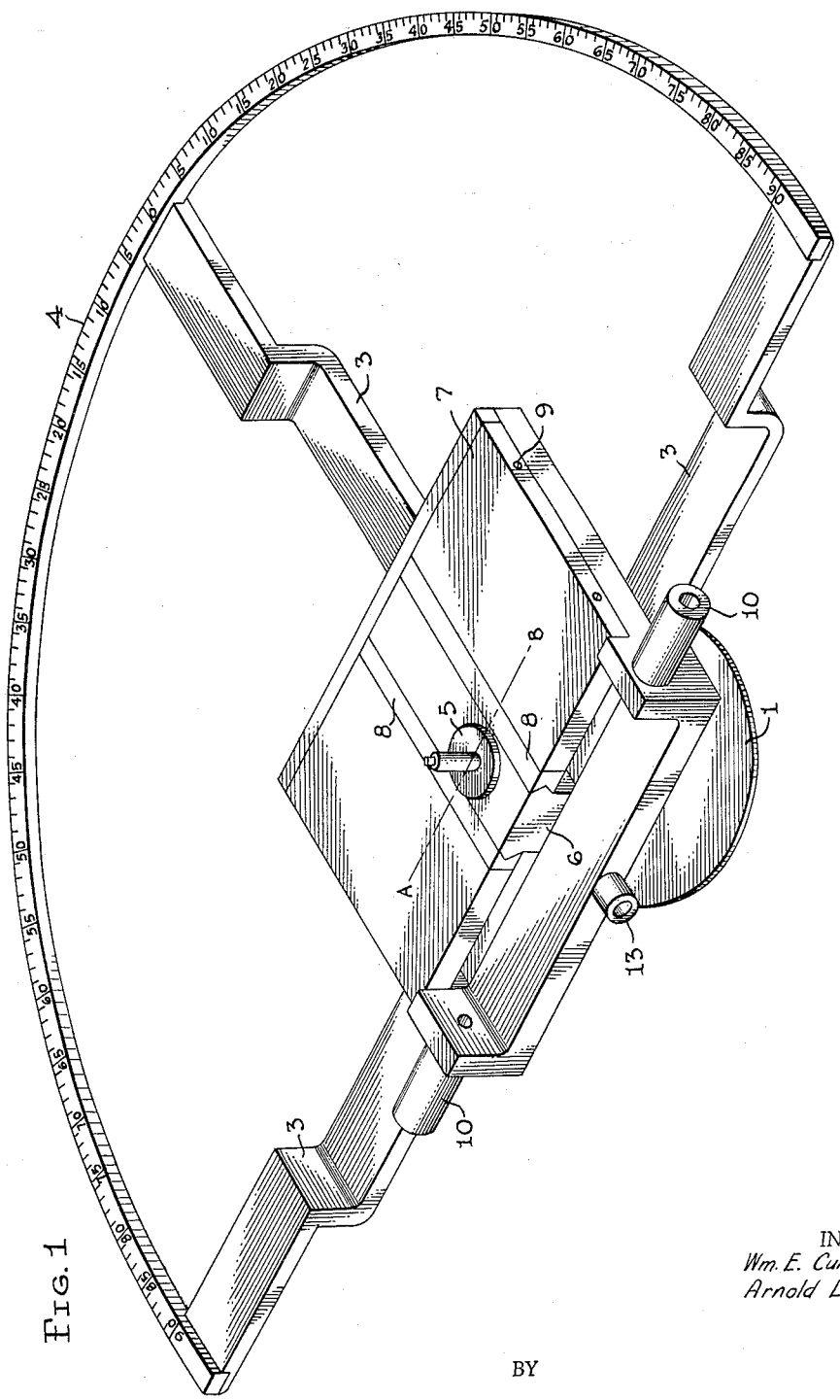
Figure 2:
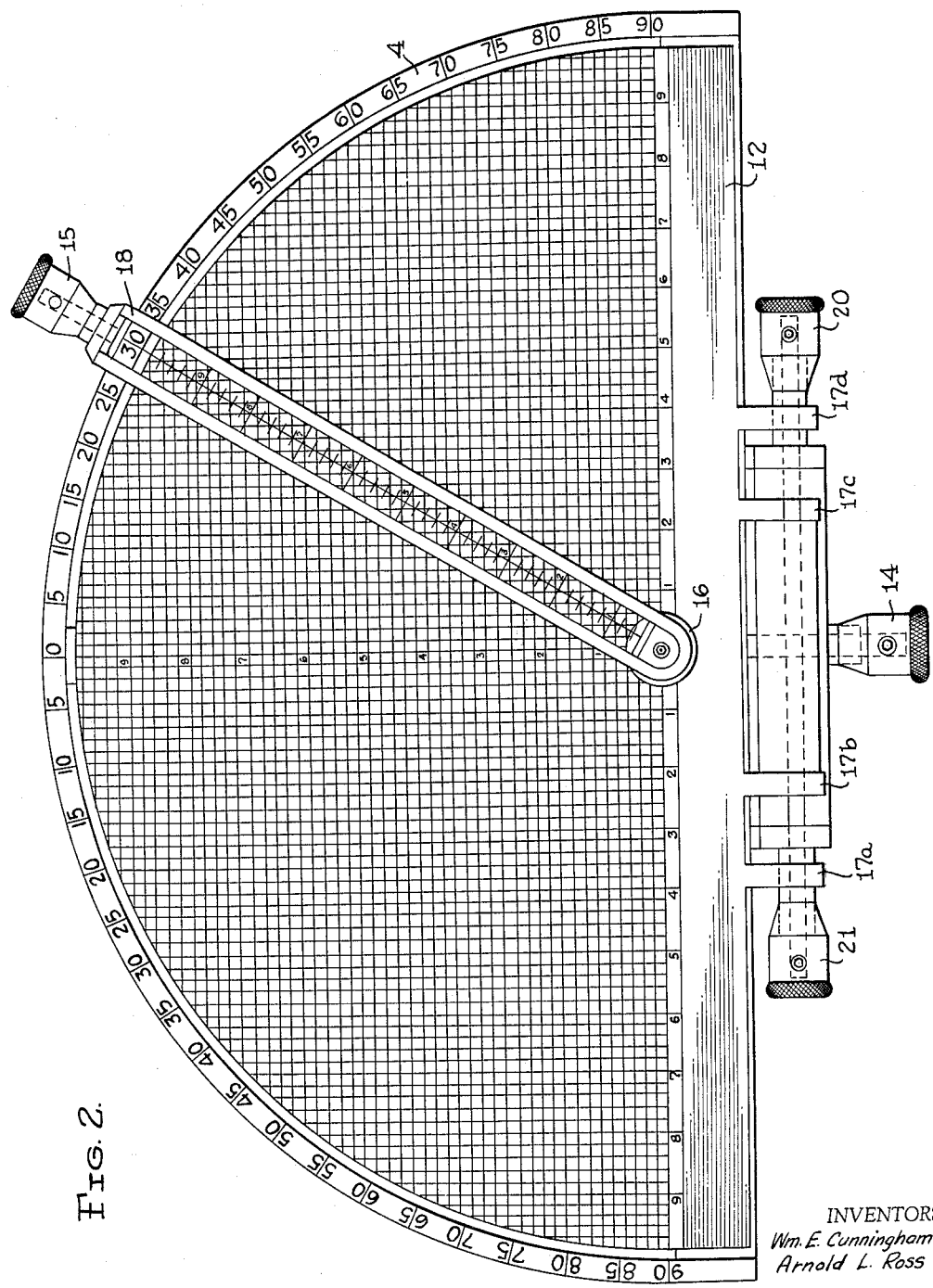
Figure 3:
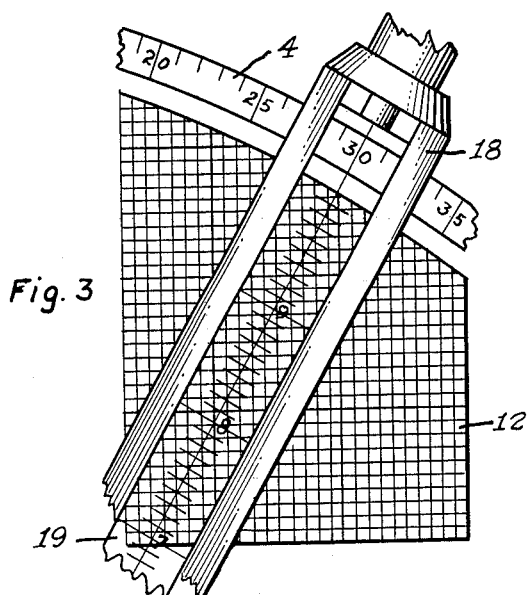
Figure 4:
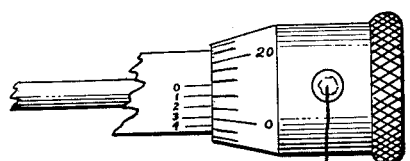
Figure 5:
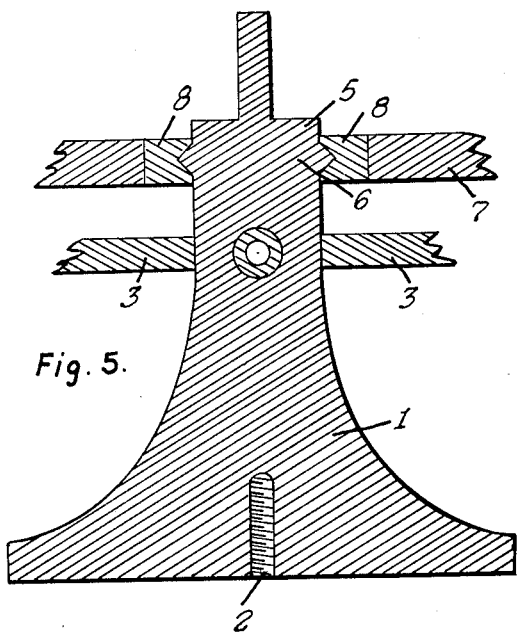

In the accompanying drawings, we show the novel features which we believe to be characteristic of our invention, both as to the manner of its organization and mode of operation and which we believe will be better understood from the following description when read in conjunction with the accompanying drawings in which FIGURE 1 shows an isometric view of the base with the sub-grid frame in place; FIGURE 2 shows a top view of the grid in place on the sub-grid frame and base with the movable arm and micrometers; FIGURE 4 shows an enlarged view of one of the micrometers with the vernier scale; FIGURE 3 shows an enlarged view of the distal end of the movable arm with a section of the grid beneath; and FIGURE 5 shows a sectional view through the center of the post at A—B in FIGURE 1.

The basic instrument is composed of four important parts as follows: (1) a base rotatable through 360 degrees on a tripod head and lockable in any position; (2) a sub-grid frame attached to the said base by a tongue and groove slide in such a manner that its movement relative to the base will be in a direction parallel to the shorter grid lines on the grid above, hereinafter called the vertical grid lines; (3) a movable grid, with grid lines spaced .100 of an inch apart in two directions at right angles, attached to the sub-grid frame in such a manner as to permit movement relative to the sub-grid frame and base in a direction parallel to the longer lines on the grid, hereinafter referred to as the horizontal grid lines; and (4) a movable arm with the proximal end attached to and rotatable about a vertical post, which is a fixed part of the base, fitted with a transparent slide movable in directions parallel to the sides of the arm, and terminating with a micrometer at the distal end.

Referring now to the reference drawings in which the same numbers indicate the same elements, the base is composed of the support 1 with a tripod screw hole 2 in the bottom; the arms 3; the arc 4; and the center post 5 of which the tongued part of the slide 6 is an integral part, terminating in a square portion for self-alignment of the accessory compass. The sub-grid frame 7 which articulates with the base along the tongue and groove slide 6 with two adjustable grooved members 8 held firmly in sliding contact with the rigid tongued portion 6 by the four adjustment screws 9 of which two are shown, and carries the two cylindrical extensions 10 which accommodate the extensions 17 of the grid 12 and the shorter extension 13 which accommodates the micrometer 14 responsible for moving and measuring the movement of the sub-grid frame 7 relative to the said base.

In the grid 12 is a hole 16 at least .250 of an inch greater in diameter than the round portion of the center post 5 to allow the grid 12 to be moved at least .100 of an inch in three directions from the 0 setting. 17a, b, c, d are extensions of the grid 12 for purposes which will become evident with further explanation. The arm 18 is attached at its proximal end to the base over a small extension of the center post 5; is rotatable about the said extension through 180 degrees of arc; and terminates with the micrometer 15 on the distal end, the said micrometer being responsible for moving and measuring the movement of the slide 19 relative to the sides of the said arm 17. The transparent slide 19 is calibrated with cross lines spaced .100 of an inch apart which align perfectly with the horizontal grid lines when all micrometers are at their 0 positions and the center line of slide 19 aligns with the 0 mark on arc 4 or with the vertical grid lines when the center line of the said slide aligns with either 90 degree mark on the said arc. Micrometer 20 when its thimble is turned clockwise, will move the grid 12 to the right parallel to the horizontal grid lines and will indicate the amount of displacement to the right of the 0 position. Micrometer 21, when its thimble is turned clockwise, will move the grid 12 to the left and will indicate the amount of displacement to the left of the 0 position. Micrometer 14 similarly moves the grid 12 and sub-grid frame 7 relative to the base parallel to the vertical grid lines and indicates the amount of displacement of the grid 12 from its 0 position in that direction. All micrometers have vernier calibrations as shown in FIGURE 4 and are capable of measuring accurately to $\frac{1}{10000}$ of an inch.

To "zero in" the grid 12 and the movable arm 17, set all micrometers at their 0 positions. Move the arm 17 to perfect alignment with the 0 degree mark on arc 4. The cross grid lines of the said arm 17 should align perfectly with the horizontal grid lines of the grid 12. If they do not, turn the thimble of micrometer 15 until they are in perfect alignment. Then loosen the Allen screw 22, set the thimble at 0, and retighten the Allen screw 22. Now move the arm 17 to either 90 degree mark on arc 4 and set micrometers 20 and 21 in a similar manner.

A simple, cheaper model of this instrument could be made using only the right quadrant of the grid.

To solve a typical problem of finding the latitude and departure of a point B located 835.5 feet from point A on a bearing of 22 degrees, proceed as follows: Move the arm 17 until the center line of the slide 19 aligns perfectly with the right-hand 22° mark on arc 4. Turn the thimble of micrometer 15 counterclockwise (the indicia are in reverse on this one) until a reading of .055 is obtained. Then locate the cross-line of slide 19 that represents 83. This line will be used to represent 830 feet. But the movement of the micrometer 15 increased the distance by .055 of an inch, so the said cross line represents 835.5 feet. Now to find the latitude, turn the thimble of micrometer 14 clockwise until a horizontal grid line is in perfect alignment with the cross formed by the said 83rd cross line and the center line of the slide 19. The reading on micrometer 14 would be .074 and the 77th horizontal grid line would be in alignment. The latitude would be 777.4 feet. To find the departure turn the thimble of micrometer 20 clockwise until a vertical grid line is in perfect alignment with the same said cross line on the slide 19. The reading on micrometer 20 would be .041 and the 31st grid line would be in alignment. The departure, therefore, would be 314.1 feet.

Another typical problem might be to find the sine and cosine of an angle of 36 degrees. To solve this problem, proceed as follows: First set micrometer 15 at 0 and move arm 17 until the center line centers accurately over the 36 degree mark on arc 4. (Right hand quadrant.) To find the cosine, turn thimble of micrometer 14 until a horizontal grid line is in perfect alignment with the cross formed by the junction of cross line 10 and the center line of the slide 19. The reading on the micrometer 14 will be .090 and the horizontal grid line 80 will be in alignment. The cosine of the 36 degree angle is, therefore, .8090. To find the sine of the same angle, turn the thimble of micrometer 20 clockwise until a vertical grid line is similarly centered with the 10 cross line of the slide 19. The reading on this micrometer will be .078 and the 58th vertical grid line will be the one so aligned. The sine of the 36 degree angle is, therefore, .5878.

A book of instructions would be furnished with each instrument to illustrate the numerous types of problems that may be solved with the basic instrument and the additional ones that may be solved with the additional accessories mentioned.

While we have illustrated and described particular embodiments of our invention, modifications which are within the scope of our invention may occur to those skilled in the art, so we desire it to be understood, therefore, that all such modifications are included in the scope of the claims annexed to and forming a part of this application.

What we claim and desire to secure by Letters Patent of the United States is

1. A micrometric grid calculator comprising a base for mounting on a tripod head; an arc, calibrated in degrees, supported by three extensions or arms of the said base; a sub-grid frame attached to said base by a tongue and groove slide to permit unidirectional movement relative to said base; a semicircular movable grid, with grid lines inscribed on the face thereof .100 of an inch apart in two directions at right angles, attached to the said sub-grid frame in such a manner as to permit movement relative to said sub-grid frame and said base in a direction at right angles to the direction of movement of the said sub-grid frame relative to the said base; a movable arm, with its proximal end pivotally attached to an extension of the said base and its distal end extending beyond the outer edge of the said arc, a transparent slide, attached to said arm with tongues and grooves so as to permit longitudinal movement of the said slide relative to the said arm, said transparent slide being cross-marked with index lines spaced .1000 of an inch apart; a micrometer on the distal end of the said slide to provide micrometric measurement of the movement of the said slide relative to the said arm; two micrometers at opposite ends of the movable grid to provide micrometric measurement of the horizontal movement of the said grid relative to a selected index mark on the said slide of the said movable arm; and a fourth micrometer at the middle of the straight side of the said semi-circular grid to provide micrometric measurement of vertical movement of the said movable grid relative to the said selected index mark on the said movable arm.

2. A micrometric grid calculator comprising a base, with a tripod screw hole in the bottom and three arms radiating from the center thereof at right angles to one another; a semicircular degree-calibrated arc attached to the outer ends of the said three arms of the said base; a subgrid frame attached to the said base by a tongue and groove slide to permit back and forth movement of the said sub-grid frame relative to the base; a semicircular movable grid with grid lines inscribed thereon and spaced .100 of an inch apart in two directions parallel to and at right angles to the direction of back and forth movement of the said sub-grid frame relative to the said base; a post extending from said base, a movable arm, with its proximal end attached to and rotatable about said post, and its distal end extending beyond the outer edge of the said arc, a transparent slide attached with tongues and grooves to said arm so as to permit longitudinal movement of the said slide relative to the said arm and marked with grid lines spaced .100 of an inch apart parallel to and at right angles to the longitudinal axis of the said movable arm; a micrometer on the distal end of the said slide to effect longitudinal movement of the said slide and provide micrometric measurement of such movement of the said slide relative to the said arm; two more micrometers, one at each end of the said movable grid to effect horizontal movement of the grid relative to the said base and provide micrometric measurement of such movement of the said grid relative to the said base or to a specified selected index mark on the transparent movable slide; and a fourth micrometer at the middle of the straight edge of the said movable grid to effect vertical or back and forth movement of the said movable grid relative to the said base and provide micrometric measurement of such movement of the said grid relative to the said base or relative to the said specific selected index mark on the said slide.

References Cited in the file of this patent

UNITED STATES PATENTS

| | | |
|---|---|---|
| 129,311 | Biggs | July 16, 1872 |
| 313,659 | Dolman | Mar. 10, 1885 |
| 1,003,857 | Adams | Sept. 19, 1911 |
| 2,467,899 | Lowkrantz | Apr. 19, 1949 |